US012333799B2

(12) United States Patent
Rashid et al.

(10) Patent No.: US 12,333,799 B2
(45) Date of Patent: Jun. 17, 2025

(54) OPTIMIZED MULTI-STAGE INTERMITTENT FUGITIVE EMISSION DETECTION

(71) Applicant: Schlumberger Technology Corporation, Sugar Land, TX (US)

(72) Inventors: Kashif Rashid, Wayland, MA (US); Andrew J. Speck, Milton, MA (US); Andrew Emil Pomerantz, Lexington, MA (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 519 days.

(21) Appl. No.: 17/658,309

(22) Filed: Apr. 7, 2022

(65) Prior Publication Data

US 2023/0326201 A1 Oct. 12, 2023

Related U.S. Application Data

(63) Continuation-in-part of application No. 17/261,785, filed as application No. PCT/US2019/042522 on Jul. 19, 2019.
(Continued)

(51) Int. Cl.
G06V 20/17 (2022.01)
G06V 20/10 (2022.01)
G08G 5/32 (2025.01)

(52) U.S. Cl.
CPC ............ *G06V 20/176* (2022.01); *G06V 20/17* (2022.01); *G08G 5/32* (2025.01)

(58) Field of Classification Search
CPC ..... G06V 20/176; G06V 20/17; G08G 5/0034
See application file for complete search history.

(56) References Cited

U.S. PATENT DOCUMENTS 5,430,293 A 7/1995 Sato
5,539,638 A 7/1996 Keeler
(Continued)

FOREIGN PATENT DOCUMENTS

CN 102591351 A 7/2012
CN 104181276 A 12/2014
(Continued)

OTHER PUBLICATIONS

International Search Report and Written Opinion issued in International Patent Application No. PCT/US2023/017685 dated Aug. 9, 2023, 10 pages.
(Continued)

*Primary Examiner* — Mohamed Charioui
*Assistant Examiner* — Xiuqin Sun
(74) *Attorney, Agent, or Firm* — Jeffrey D. Frantz

(57) ABSTRACT

Methods and apparatus for fugitive emission detection. In some embodiments, the method can include planning and performing aerial inspections of a plurality of structures within one or more facilities by determining a flight path for a scanning of fugitive emissions from a plurality of structures within one or more facilities. The flight path can cover a set of structure clusters that can be serviced by a base. The method can also include using a computer-implemented clustering method to identify the set of structure clusters that can be serviced by the respective base. The clustering method can be a hierarchical multilevel clustering method. The method can also include scanning the plurality of structures for fugitive emissions using an airborne sensor. The airborne sensor can be mounted to a flight vehicle launched from the base. The method can also include classifying the plurality of structures based on results of the scanning.

12 Claims, 5 Drawing Sheets

Related U.S. Application Data

(60) Provisional application No. 62/701,258, filed on Jul. 20, 2018.

(56) References Cited

U.S. PATENT DOCUMENTS

| | | | |
|---|---|---|---|
| 6,662,795 | B2 | 12/2003 | Baldwin |
| 6,822,742 | B1* | 11/2004 | Kalayeh ............ G01N 21/3504 |
| | | | 356/432 |
| 6,975,975 | B2 | 12/2005 | Fasca |
| 7,073,748 | B2 | 7/2006 | Maurer |
| 7,096,749 | B2 | 8/2006 | Schimmoller |
| 7,998,731 | B2 | 8/2011 | Daitch |
| 8,197,752 | B2 | 6/2012 | Nojima |
| 8,820,672 | B2 | 9/2014 | Erben |
| 9,405,533 | B2 | 8/2016 | Bouzas |
| 9,890,677 | B2 | 2/2018 | Adams |
| 10,065,739 | B2 | 9/2018 | Duesterhoft |
| 10,086,938 | B2 | 10/2018 | Duesterhoft |
| 10,094,773 | B2 | 10/2018 | Myshak |
| 10,113,956 | B1 | 10/2018 | Li |
| 10,139,837 | B2 | 11/2018 | Qin |
| 10,175,151 | B2 | 1/2019 | Avakov |
| 10,179,655 | B2 | 1/2019 | Gurumoorthi |
| 10,192,182 | B2 | 1/2019 | Whipple |
| 10,322,803 | B2 | 6/2019 | Flood |
| 10,330,571 | B2 | 6/2019 | Adams |
| 10,408,028 | B2 | 9/2019 | Stephenson |
| 10,662,765 | B2 | 5/2020 | Ferguson |
| 2004/0128097 | A1 | 7/2004 | LaMarca |
| 2004/0263852 | A1 | 12/2004 | Degtiarev |
| 2005/0134859 | A1 | 6/2005 | Kalayeh |
| 2006/0011776 | A1 | 1/2006 | Maurer |
| 2006/0123928 | A1 | 6/2006 | Schimmoller |
| 2007/0079640 | A1 | 4/2007 | Bendel |
| 2007/0273557 | A1 | 11/2007 | Baillot |
| 2010/0250022 | A1 | 9/2010 | Hines |
| 2011/0144828 | A1 | 6/2011 | Chengalva |
| 2011/0166836 | A1 | 7/2011 | Kaplan |
| 2012/0054270 | A1 | 3/2012 | Foreman |
| 2012/0092649 | A1 | 4/2012 | Wong |
| 2012/0166022 | A1 | 6/2012 | Kwon |
| 2012/0166096 | A1 | 6/2012 | Stephenson |
| 2012/0191269 | A1 | 7/2012 | Chen |
| 2013/0176570 | A1 | 7/2013 | Beck |
| 2013/0208262 | A1 | 8/2013 | Andreussi |
| 2013/0234864 | A1 | 9/2013 | Herman |
| 2013/0295212 | A1 | 11/2013 | Chen |
| 2014/0365258 | A1 | 12/2014 | Vestal |
| 2015/0234387 | A1 | 8/2015 | Mullan |
| 2015/0321758 | A1 | 11/2015 | Sarna, II |
| 2015/0323449 | A1 | 11/2015 | Jones |
| 2016/0025603 | A1 | 1/2016 | Kindt |
| 2016/0222771 | A1 | 8/2016 | Stephenson |
| 2016/0328943 | A1 | 11/2016 | Cenac |
| 2016/0363932 | A1 | 12/2016 | Moriarity |
| 2016/0370263 | A1 | 12/2016 | Duesterhoft |
| 2017/0003684 | A1 | 1/2017 | Knudsen |
| 2017/0161972 | A1 | 6/2017 | Moloney |
| 2017/0226842 | A1 | 8/2017 | Omont |
| 2017/0240278 | A1 | 8/2017 | Loud |
| 2017/0323240 | A1 | 11/2017 | Johnson |
| 2017/0345317 | A1 | 11/2017 | Heinonen |
| 2018/0074519 | A1 | 3/2018 | Qin |
| 2018/0136093 | A1 | 5/2018 | Avakov |
| 2018/0224854 | A1* | 8/2018 | Mullan ................ H04L 67/12 |
| 2018/0292374 | A1 | 10/2018 | Dittberner |
| 2019/0003918 | A1 | 1/2019 | Li |
| 2019/0128711 | A1 | 5/2019 | Connor |
| 2019/0128862 | A1 | 5/2019 | Willett |
| 2019/0204189 | A1 | 7/2019 | Mohr, Jr. |
| 2019/0234868 | A1 | 8/2019 | Tanomura |
| 2020/0019168 | A1 | 1/2020 | Guzman |
| 2020/0103881 | A1 | 4/2020 | Halgren, III |
| 2021/0004020 | A1 | 1/2021 | Yang |
| 2021/0255157 | A1 | 8/2021 | Rashid |
| 2024/0192186 | A1 | 6/2024 | Gadot |
| 2024/0319370 | A1 | 9/2024 | Embry et al. |

FOREIGN PATENT DOCUMENTS

| | | | |
|---|---|---|---|
| CN | 107300927 | A * | 10/2017 ............ G05D 1/101 |
| EP | 2908203 | A1 | 8/2015 |
| EP | 2908203 | B1 | 3/2019 |
| KR | 20080022649 | A | 3/2008 |
| KR | 20200009310 | A | 1/2020 |
| KR | 102111121 | B1 | 5/2020 |
| KR | 102237432 | B1 | 4/2021 |
| WO | 2009058697 | A1 | 5/2009 |
| WO | 2015113962 | A1 | 8/2015 |
| WO | 2017048543 | A1 | 3/2017 |
| WO | 2019246280 | A1 | 12/2019 |

OTHER PUBLICATIONS

Office Action issued in U.S. Appl. No. 17/261,785 dated Mar. 4, 2024, 33 pages.

Cordeau, J. F. et al. in "A unified tabu search heuristic for vehicle routing problems with time windows", Journal of the Operational Research Society, 2001, 52, pp. 928-936.

Johnson et al., "Blinded evaluation of airborne methane source detection using Bridger Photonics LiDAR", Remote Sensing of Environment, 2021, 259, 1124418, 10 pages.

Alvarez, R. A., et al. "Assessment of methane emissions from US oil and gas supply chain", Science 2018, 396 361 (6398), pp. 186-188.

Bagtzoglou, A. C. et al., "Near real-time atmospheric contamination source identification by an optimization-based inverse method", Inverse Problems in Science and Engineering 205, 13(3), pp. 241-259.

Fox, T. A. et al., "A review of close-range and screening technologies for mitigating fugitive methane emissions in upstream oil and gas", Environmental Research Letters, 2019, 14(5),053002, 20 pages.

Gemerek, J. R. et al., "Fugitive gas emission rate estimation using multiple heterogeneous mobile sensors" 2017 ISOCS/IEEE International Symposium on Olfaction and Electronic Nose (ISOEN), IEEE, pp. 1-3.

Golston, L. M. et al., "Natural gas fugitive leak detection using an unmanned aerial vehicle: Localization and quantification of emission rate", Atmosphere, 2018, 9(9), 333, 17 pages.

Klein, L. J. et al., "Wireless sensor networks for fugitive methane emissions monitoring in oil and gas industry", 2018 IEEE International Congress on Internet of Things (ICIOT), IEEE, pp. 41-48.

Saide, P. E. et al., "Evaluating Methods to Estimate Methane Emissions from Oil and Gas Production Facilities Using LES Simulations", Environmental Science Technology, 2018, 52(19), pp. 11206-11214.

Travis, B. et al., "Neural networks to locate and quantify fugitive natural gas leaks for a 466 mir detection system", Atmospheric Environment: X 20,8, 100092, 12 pages.

Meribout, M. et al., "Leak detection systems in oil and gas fields: Present trends and future prospects", Flow Measurement and Instrumentation, 2020, 75, 101772, 18 pages.

Olaguer, E. P. et al., "Landfill Emissions of Methane Inferred from Unmanned Aerial Vehicle and Mobile Ground Measurements", Atmosphere, 2002, 13(6), 983, 19 pages.

Galfalk, M. et al., "Sensitive Drone Mapping of Methane Emissions without the Need for Supplementary Ground-Based Measurements", ACS Earth and Space Chemistry, 2021, 5(10), pp. 2668-2676.

Shaw, J. T. et al., "Methods for quantifying methane emissions using unmanned aerial vehicles: a review", Philosophical Transactions of the Royal Society A, 2021, 379(2210), 20200450, 21 pages.

Barchyn, T. E., et al., "A UAV-based system for detecting natural gas leaks", Journal of Unmanned Vehicle Systems, 2017, 6(1), pp. 18-30.

(56) References Cited

OTHER PUBLICATIONS

Barchyn, T. E. et al., "Plume detection modeling of a drone-based natural gas leak detection system", Elementa: Science of the Anthropocene, 2019, 13 pages.

Emran, B. J. et al., Low-altitude aerial methane concentration mapping. Remote Sensing, 2017, 9(8), 823, 13 pages.

An, J. et al., "Variational Autoencoder based Anomaly Detection using Reconstruction Probability," Special Lecture on IE, 2015, 2(1), 18 pages.

Ravikumar, A. P. et al., "Are Optical Gas Imaging Technologies Effective for Methane Leak Detection", Environmental Science Technology, 2017, 51(1), pp. 718-724.

Ravikumar, A. P. et al., "Single-blind inter-comparison of methane detection technologies-results from the Stanford/EDF Mobile Monitoring Challenge", Elementa: Science of the Anthropocene, 7, 2019, 16 pages.

Zimmerle, D. et al., "Detection Limits of Optical Gas Imaging for Natural Gas Leak Detection in Realistic Controlled Conditions", Environmental Science Technology, 2020, 54(18), pp. 11506-11514.

International Search Report and Written Opinion issued in the PCT Application No. PCT/US2015/010446 dated Apr. 28, 2015, 15 pages.

International Search Report and Written Opinion issued in the PCT Application No. PCT/US2016/050326 dated Nov. 28, 2016, 18 pages.

International Search Report and Written Opinion issued in the PCT Application No. PCT/US/2019/042522 dated Oct. 31, 2019, 13 pages.

International Preliminary Report on Patentability issued in the PCT Application No. PCT/US2019/042522 dated Feb. 4, 2021, 10 pages.

International Search Report and Written Opinion issued in the PCT Application No. PCT/US2023/017685 dated Aug. 9, 2023, 10 pages.

International Search Report and Written Opinion issued in the PCT Application No. PCT/US2023/033130 dated Jan. 11, 2024, 11 pages.

Office Action issued in U.S. Appl. No. 17/261,785 dated Oct. 10, 2024, 18 pages.

Cordeau et al., "A unified tabu search heuristic for vehicle routing problems with time windows", Journal of the Operational Research Society (2001) 52, 928-936.

International Search Report and Written Opinion issued in International Patent Appl. No. PCT/US2019/042522 on Oct. 19, 2019; 13 pages.

Johnson et al., Blinded evaluation of airborne methane source detection using Bridger Photonics LiDAR, Remote Sensing of Environment, 259 (2021) 1124418 (10 pages).

International Preliminary Report on Patentability issued in International Patent Appl. No. PCT/US2019/042522 on Feb. 2, 2021; 10 pages.

Office Action issued in U.S. Appl. No. 17/261,785 dated Dec. 16, 2024, 31 pages.

\* cited by examiner

OPTIMIZED MULTI-STAGE INTERMITTENT FUGITIVE EMISSION DETECTION

CROSS-REFERENCE TO RELATED APPLICATION(S)

This application is a continuation-in-part of co-pending U.S. patent application Ser. No. 17/261,785, filed on Jan. 20, 2021, which is a National Stage application under 35 U.S.C. § 371 of PCT/US2019/042522, filed on Jul. 19, 2019, and published as WO 2020/018867, which claims priority to U.S. Provisional Patent Application No. 62/701,258, filed on Jul. 20, 2018, which are all incorporated by reference herein.

FIELD

The subject disclosure relates generally to detection of fugitive emissions.

BACKGROUND

Methane is the primary component of natural gas. Methane is a short-lived climate pollutant responsible for approximately twenty percent of anthropogenic greenhouse gas emissions. Fugitive methane emission can occur when methane escapes during drilling, hydrocarbon extraction, and transportation processes. Reducing fugitive methane emission and other fugitive emissions in the oil and gas industry is considered among the most urgent and actionable measures to mitigate climate change, and an important complement to reducing carbon dioxide emissions.

The oil and gas industry is commonly divided into three sectors: (i) an upstream sector that finds and produces crude oil and natural gas, ii) a midstream sector that transports, stores, processes, and markets crude oil, natural gas, and natural gas liquids (such as ethane, propane and butane) as well as refined products, and iii) a downstream sector that includes oil refineries, petrochemical plants, petroleum products distributors, retail outlets and natural gas distribution companies.

Within the upstream sector of the oil and gas industry, the main technical challenge in reducing fugitive methane emission is locating methane emission sources, which typically arise from well sites or pads in remote, unmanned locations. Methane emission rates from well sites are widely distributed, with the highest-emitting 5% of sites (so called "super-emitters") responsible for approximately 50% of fugitive methane emissions. The extent to which fugitive methane emissions can be reduced by leak detection and repair programs depends on the sensitivity of the detector used to identify methane emissions and the frequency with which inspections are performed (among other factors). Improving detector sensitivity generally results in greater methane emissions reduction because more leaks can be detected with more sensitive equipment. However, there is a threshold at which detection sensitivity is sufficient to capture all significant leaks, and further improvements in sensitivity beyond that threshold no longer result in meaningful methane emission reductions. Increasing inspection frequency generally results in greater methane emissions reduction by decreasing the duration of emission events.

Today, fugitive emissions in the upstream, midstream, and downstream oil and gas sector are detected via several in-situ techniques. For example, in the upstream oil and gas sector fugitive methane emissions are commonly detected via optical gas imaging surveys in which a work crew drives to well sites and compressor stations and inspects for leaks using an infrared camera. Due to the sparse and remote locations of many sites, emission detection methods that involve a work crew driving to the sites are relatively inefficient.

Numerous sensors for detecting oil and gas fugitive emissions are being developed, including permanently installed sensors, handheld sensors, and mobile sensors mounted on trucks, drones, helicopters, airplanes, and satellites. For example, laser-based LiDAR sensors have been deployed on small aircraft. These airborne LiDAR sensors are mounted on the aircraft and employ a laser that emits a beam of electromagnetic energy that is tuned to a wavelength of strong methane absorption from the low-flying aircraft, and then detected after reflecting off the ground. This detected response can be processed to deduce the concentration of methane present in the atmosphere with a high spatial resolution. Compared to other airborne methane emissions detectors, airborne LiDAR sensors can have relatively high sensitivity, with limits of detection (determined by controlled released experiments), for example, approaching the 1 kg methane/hour emission rate threshold under favorable conditions (i.e., wind speeds below 15 miles per hour). Airborne LiDAR technology is used today in the midstream oil and gas sector to monitor emissions from pipelines. Deploying this technology to monitor pipelines is, in one regard, relatively straightforward because the aircraft can simply fly directly along the pipeline route.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Methods and apparatus for fugitive emission detection are provided. In some embodiments, the method can include planning and performing aerial inspections of a plurality of structures within one or more facilities by determining a flight path for a scanning of fugitive emissions from a plurality of structures within one or more facilities. The flight path can cover a set of structure clusters that are serviced by a base. The method can also include using a computer-implemented clustering method to identify the set of structure clusters that are serviced by the respective base. The clustering method can be a hierarchical multilevel clustering method. The method can also include scanning the plurality of structures for fugitive emissions using an airborne sensor. The airborne sensor can be mounted to a flight vehicle launched from the base. The method can also include classifying the plurality of structures based on results of the scanning.

In some embodiments, the method can include planning aerial inspection of a plurality of structures within one or more facilities. The method can also include a) storing data that represents the plurality of structures in the one or more facilities and data that represents at least one base. The at least one base can support aerial inspection of the plurality of structures in the one or more facilities. The method can also include b) selecting a particular base. The method can also include c) performing a clustering method on the data of a) to define cluster data representing a set of structure clusters in the one or more facilities that are associated with the particular base of b). The clustering method can be a hierarchical multilevel clustering method. The method can also include d) processing the cluster data of c) to determine flight path data representing flight path segments that form a trip, wherein the trip can originate at the particular base, travels to a sequence of structure clusters, scans each structure in each structure cluster, and returns back to the particular base, wherein the sequence of structure clusters of the trip can correspond to the set of structure clusters represented by the cluster data of c), wherein the flight path data representing the flight segments of the trip can be determined by minimizing flight time costs for the trip, The method can also include storing flight vehicle data that represents operational parameters for at least one flight vehicle, and storing sensor data that represents operational parameters for at least one airborne sensor.

In one embodiment, the apparatus can include computer memory storing data that represents a plurality of structures within one or more facilities as well as at least one base. The at least one base can support aerial inspection of the plurality of structures within one or more facilities. The apparatus can also include at least one processor configured to perform operations that involve: a) selecting a particular base; b) performing a clustering method on the data stored in the computer memory to define cluster data representing a set of structure clusters in the one or more facilities that can be associated with the particular base. The clustering method can be a hierarchical multilevel clustering method; and c) processing the cluster data of b) to determine flight path data representing flight path segments that form a trip. The trip can originate at the particular base, travel to a sequence of structure clusters and scan each structure in each structure cluster, and return back to the particular base. The sequence of structure clusters of the trip can correspond to the set of structure clusters represented by the cluster data of b).

Other aspects can also be described and claimed.

BRIEF DESCRIPTION OF THE DRAWINGS

The subject disclosure is further described in the detailed description which follows, in reference to the noted plurality of drawings by way of non-limiting examples of the subject disclosure, in which like reference numerals represent similar parts throughout the several views of the drawings, and wherein.

DETAILED DESCRIPTION

Figure 1A:
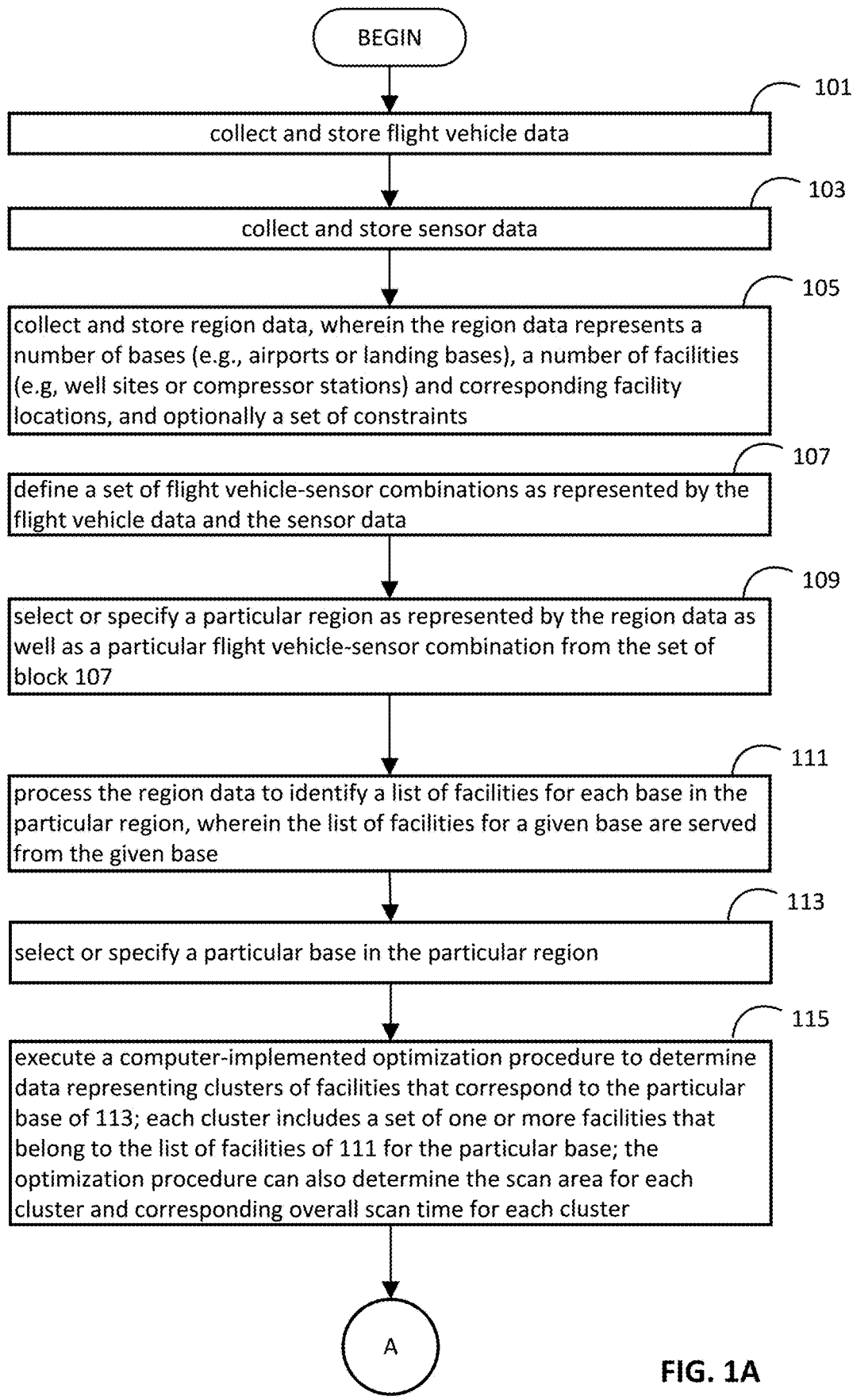
FIGS. 1A-1C, collectively, is a flowchart that illustrates an exemplary workflow of the subject disclosure.

The particulars shown herein are by way of example and for purposes of illustrative discussion of the examples of the subject disclosure only and can be presented in the cause of providing what might be the most useful and readily understood description of the principles and conceptual aspects of the subject disclosure. In this regard, no attempt is made to show structural details in more detail than is necessary, the description taken with the drawings making apparent to those skilled in the art how the several forms of the subject disclosure can be embodied in practice. Furthermore, like reference numbers and designations in the various drawings indicate like elements.

With regard to the embodiments of the workflows described herein that deploy one or more airborne sensors to monitor and detect fugitive emissions in the upstream oil and gas sector, the term "airborne sensor" or "sensor" refers to a mobile instrument or apparatus that is mounted to a flight vehicle and that can be configured to monitor and detect fugitive emissions originating from surface-located facilities from the air while flying the flight vehicle. In non-limiting examples, an airborne sensor can be a LiDAR instrument, a gas remote detection instrument, a differential-absorption LiDAR instrument, a gas-mapping LiDAR instrument, a laser-based detection instrument, a non-laser-based detection instrument e.g. a spectrometer, or other suitable remote methane sensor. Note that the swath, scanning speed, sensitivity and other operational parameters can vary amongst the different types of the one or more airborne sensors.

The term "flight vehicle" refers to a vehicle that is capable of travelling through the air. In non-limiting examples, a flight vehicle can be a drone, helicopter, a fixed-winged airplane, or other aircraft or flight vehicle.

The term "drone" refers to an unmanned aerial vehicle. The unmanned aerial vehicle can include a body, one or more rotors each with one or more blades disposed thereon, a vehicle power plant, and a vehicle controller. The vehicle power plant can be powered by one or more batteries or energy storing cells, a hydrocarbon fuel, or a combination thereof. The unmanned aerial vehicle can also include fixed wings.

The term "base" refers to a physical location from which a flight vehicle and airborne sensor combination is deployed to initiate a flight that performs airborne inspection of a sequence of one or more facilities or structures therein. In non-limiting examples, a base can be an airport or landing strip or other suitable locations from which a flight vehicle with airborne sensor can be deployed. In other examples, a base can be a location where the drone can land and depart. The base can be located or disposed adjacent the facility, disposed within the facility, and/or disposed between one or more facilities. The flight vehicle can take off from a first base and land at a second or subsequent base.

The subject disclosure describes workflows that deploy one or more airborne sensors to monitor and detect fugitive emissions, such as methane, in the upstream, midstream, and downstream oil and gas sector. Deploying the one or more airborne sensors in the upstream oil and gas sector can be challenging because of the complex and sparse arrangement of upstream oil and gas facilities such as well sites and compressor stations. Comprehensive and cost-effective monitoring and detection of fugitive emissions using the one or more airborne sensors therefore requires an efficient deployment scheme.

The optimal flight path planning method utilized can be agnostic to the sensor deployed. That is, the sensor deployed can be designed to detect one or more of methane ($CH_4$), carbon-dioxide ($CO_2$), hydrogen sulfide ($H_2S$), hydrogen disulfide ($H_2S_2$) sulphur dioxide ($SO_2$), CFC, HFC, $SF_6$ (Sulfur hexafluoride), other fugitive emissions, or any combination thereof. In addition, the sensor can be designed to identify certain parts of the electromagnetic spectrum. That is, for example, the use of an infra-red sensor for heat detection, a camera for visual inspection, or the like. It may also be possible, depending on the vehicle capacity to deploy the one or more airborne sensors. For example, to detect gas leaks and visually and/or thermally inspect facilities at the same time. The subject disclosure provides a workflow that generates an optimized deployment scheme for the use of airborne sensor technology in monitoring and detecting fugitive emissions in the upstream oil and gas sector. The workflow can also be extended to estimate the environmental benefits and implementation costs associated with the optimized deployment scheme.

In some embodiments, the workflow can involve a multistage measurement scheme. In the first stage, one or more airborne sensors can be used to monitor and detect fugitive emissions from one or more upstream, midstream, and/or downstream oil and gas facilities (e.g., well sites, compressor stations, pipeline segments, processing facilities, distribution facilities, other possible sites of fugitive emissions, and/or one or more structures within the one or more facilities). The one or more structures can include one or more tanks, pipe segments, processing facilities, laboratories, and/or one or more other physical structures within the one or more facilities. The results of such monitoring and detection operations can be used to classify one or more locations where an airborne sensor has detected fugitive emissions and locations where an airborne sensor has not detected fugitive emissions. This first stage can be optimized by a procedure designed to manage facility visits in an optimal manner (for example, with respect to choice of flight vehicle, airborne sensor, and base). In a second stage, locations where an airborne sensor has detected fugitive emissions in the first stage can be subjected to a more precise but more expensive component-level inspection and repair, if need be. The component-level inspection and repair can involve inspection and repair of valves, flanges, tanks or other equipment or other components of a facility. The addition of the optimized first stage is intended to lower the cost of the component-level inspection of the second stage relative to the current practice of inspecting all well site and compressor station locations at the component level.

Component-level facility inspections typically require a small team to spend hours inspecting a facility (and often to spend hours driving to-and-from the location). To make the inspection process more efficient and less expensive, the workflow of the subject disclosure monitors and detects fugitive emissions from the one or more facilities using airborne sensor technology. The route traveled by the flight can be generated by computer-implemented optimized procedures that can be configured to manage one or more facility visits in an optimal manner (for example, with respect to choice of flight vehicle, sensor and base or launch site). Using this optimized deployment scheme, the inspection time per facility can be reduced from hours to minutes.

Figure 2:
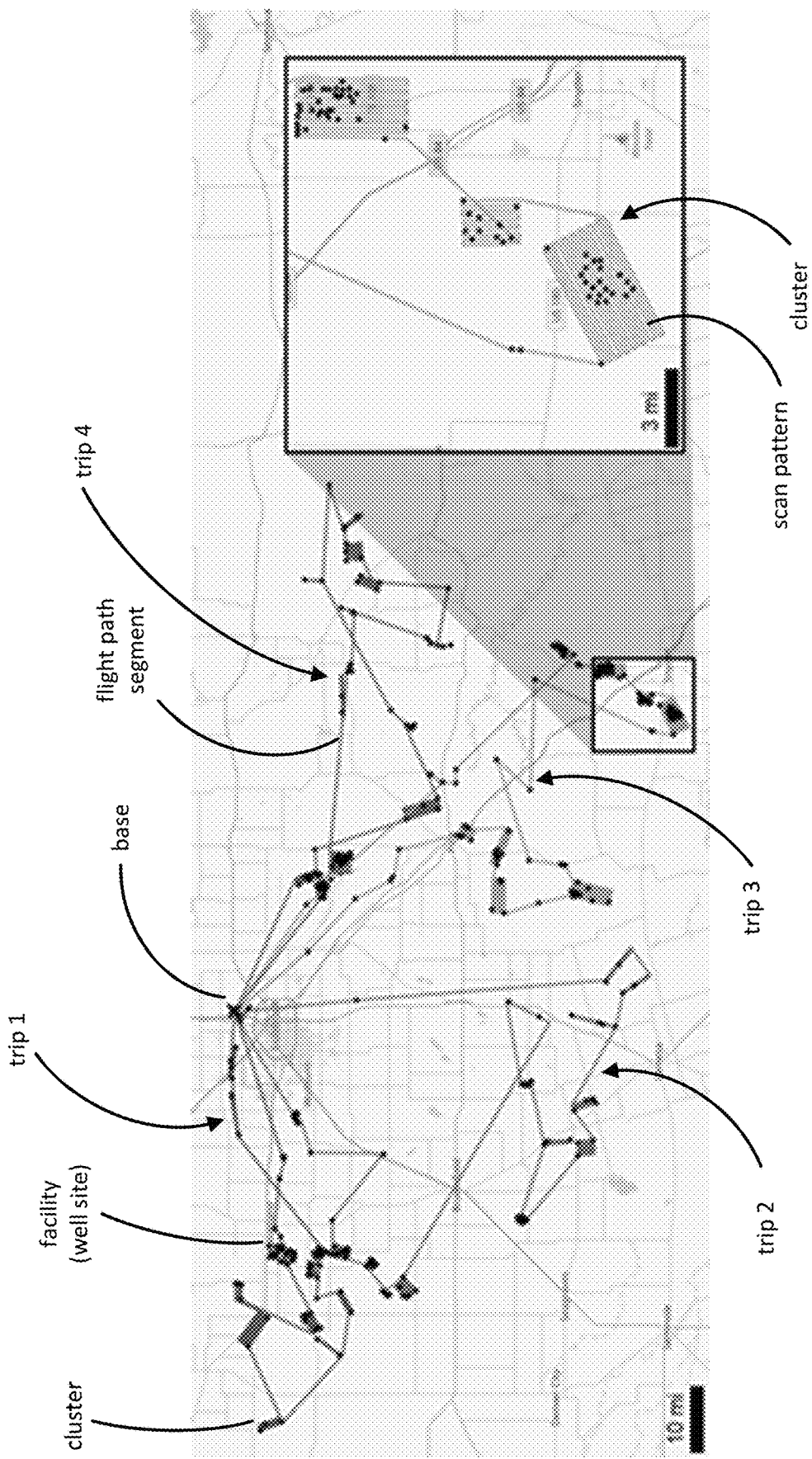
FIG. 2 illustrates an example flight path planning solution produced by the workflows of the subject disclosure as well as a template scan path for scanning one or more facilities of the clusters produced by the workflows.

An automated image segmentation procedure or a manual user defined process can be utilized to select target sites for inspections along with possible launch sites for a selected flight vehicle over an aerial map, as shown in FIG. 2. This information, together with the flight specification of the flight vehicle (speed, power utilization, etc.) and pertinent sensor data (swath, scan speed, weight, etc.) can provision the data required by the flight planning method. This segmentation procedure can be used to determine flight vehicle base locations.

The outcome from the procedure can provide an optimal number of flights necessary from each designated base in order to fully scan a given collection of one or more facilities or one or more structures within the one or more facilities. For example, there may be two or more structures within a facility that can be scanned by one or more flight vehicles launched from one or more bases, all selected in accordance with the segmentation procedure described herein. Each of the one or more facilities or one or more structures within the one or more facilities can be prescribed a certain scan radius that can set the associated scan cost at each point within a flight path. Thus, the resulting flight paths can reduce or minimize the total cost necessary to reach and scan all of the one or more facilities or one or more structures within the one or more facilities from one or more launch sites.

Note that the airborne sensor can typically determine the presence of fugitive emissions at a facility or structure that is sufficiently large as to require repair, but typically it has difficulty identifying the exact location of the fugitive emission (or leak) with sufficient precision as required to repair the leak, while traditional manual inspection using portable detectors can provide sufficient precision. The precision with which the airborne sensor can be increased by decreasing the distance between the sensor to each of the one or more facilities or structures within the one or more facilities. For example, a drone that can fly within a facility and amongst the one or more structures within the facility can more precisely detect the location of fugitive emissions versus a flight vehicle flying over the facility. Nonetheless, in the workflows described herein, the facilities and structures that can be identified by the airborne sensor inspection to have fugitive emissions can be subject to a second component-level inspection and repair. The component-level inspection and repair can involve inspection and repair of valves, flanges, tanks, or other equipment or other components of a facility. Such component-level inspection and repair can possibly use traditional manual inspection and repair methods. Because the workflows described herein limit the component-level inspection operations only to locations that can be determined to be leaking from the inexpensive optimized airborne inspection, the total cost of inspection can be lower than for the traditional procedure where the component-level is performed on all locations (or for other procedures in which the initial inspection is performed in a less efficient manner).

In one or more embodiments, the workflow as described herein deploys airborne sensor technology to rapidly scan multiple facilities for fugitive emissions. The scanning takes place in multiple stages. In this first stage, one or more airborne sensors can be used to rapidly scan multiple facilities for fugitive emissions. The results of the scanning process can be used to classify locations where an airborne sensor has detected fugitive emissions and locations where an airborne sensor has not detected fugitive emissions. In a second stage, one or more facilities where an airborne sensor has detected fugitive emissions in the first stage can be inspected for fugitive emissions with slower but more precise technology in which the presence of fugitive emissions can be confirmed and the location of the fugitive emissions can be identified and possibly repaired, if need be.

In one embodiment, a workflow that deploys the one or more airborne sensors to monitor and detect fugitive emissions in the upstream, midstream, and downstream oil and gas sectors employs the following operations:

i) Build a map of the facility or facilities (such as well sites, compressor stations, oil refineries, petrochemical plants, petroleum products distributors, retail outlets, and natural gas distribution companies or other distributed sources of potential fugitive emissions) to be scanned. This information can be obtained directly from an oil and gas company interested in having one or more of their facilities monitored for fugitive emissions, from a database, or from another source.

ii) For each facility to be scanned, determine the area near each facility that requires scanning. This area can be offset from the center of the facility in the direction of prevailing winds at the intended time of the survey. This area can be larger than the area of the facility to account for atmospheric gas dispersion beyond the area of the facility.

iii) Build a map of the locations of one or more bases.

iv) Optionally, collect and collate data describing costs and specification details of available vehicles and sensors.

v) Execute a computer-implemented optimization procedure that can be configured to plan and manage designated facility visits in an optimal manner with respect to choice of flight vehicle, sensor and base. The outcome of this procedure will be a collection of trips (flight path segments or routes) that serve to optimally scan the area associated with the one or more facilities of the data set for fugitive emission detection. This procedure is described in further detail below.

vi) The results from the preceding block v) can be used to identify the least costly flight vehicle and sensor (or flight vehicle-sensor combination) amongst the set of available flight and vehicle-sensor combinations under consideration. Note that the optimization process can be repeated for the best combination of flight vehicle and sensor using finer parameterization to furnish the best possible flight paths prior to implementation.

vii) The flight vehicle and sensor identified in block vi) can then be used to scan the designated one or more facilities using the collection of flight paths produced in block v) or vi).

viii) Facilities where the scan results of the airborne sensor detect methane emission can be marked during, or after the scan, as requiring further inspection to validate methane emissions.

ix) For facilities where a further component-level inspection is deemed necessary by the previous block viii), optionally compare the time of airborne sensor scanning to the time of any activities that can result in temporary emissions, such as liquid unloading. The airborne sensor scanning can then be repeated at facilities where potential false positive reports can have occurred due to activities resulting in temporary methane emissions.

x) Schedule component-level inspection and repair for facilities that can be deemed to require a further inspection after block ix).

xi) Perform the component-level inspection scheduled in block x) to detect and locate fugitive emissions at the respective facilities. The component-level inspection can involve inspection of valves, flanges, tanks or other equipment or other components of the respective facilities. In one or more embodiments, the component-level inspection can utilize portable technology that can effectively identify emissions, such as a gas sniffer or an optical gas imager.

xii) Repair facility components and equipment that produce the methane emissions identified in block xi), for example using standard best practices.

xiii) Verify the quality of the repair of block xii) by inspecting the repaired facility components or equipment. In one or more embodiments, portable technology as described above in block xi) can be used in block xiii) for validation of leak mitigation.

Optimal Flight Path Planning Workflow

Block v) of the workflow outlined above can be a computer-implemented optimization procedure that serves to establish flight vehicle routes necessary to carry out aerial inspection (or scanning) of a set of desired facilities or structures within one or more facilities (such as well sites, compressor stations, pipeline segments, processing facilities, distribution facilities, or other distributed sources of fugitive emissions). The routes can be traveled by one or more flight vehicles in order to carry out the aerial inspection. The operations associated with this procedure can be described in greater detail below:

1(a)—Define a set of facilities (such as well sites, compressor stations, or other distributed sources of methane emission) to be scanned as the data of interest.

1(b)—Define a set of flight vehicles under consideration.

1(c)—Define a set of one or more airborne sensors under consideration.

1(d)—Define a set of bases (and corresponding base locations) from which scanning of the facilities in the data set of 1(a) can be initiated.

2(a)—Define key attributes for each well site in the data set of 1(*a*); for example, such key attributes can include, but are not limited to, location, scan radius, center offset, etc.

(2b)—Define key attributes for each flight vehicle in the data set of 1(b); for example, such key attributes can include, but are not limited to, cruise speed, energy consumption rate, energy capacity, operating limits, etc.; note that such key attributes can be used to establish vehicle operating range in both distance and time.

(2c)—Define key attributes for each sensor in the data set of 1(c); for example, such key attributes can include, but are not limited to, sensor swath, sensor scan speed, etc.

(2d)—Define key attributes for each base in the data set of 1(d); for example, such key attributes can include, but are not limited to, resources available, vehicle operating restrictions and facilities, etc.

(2e)—Define restrictions (constraints) for the given model data; for example, such restrictions can include, but are not limited to, no-fly zones, operating restrictions, safety measures, operator selection, etc.

(2f)—Define a set of permissible vehicle, sensor and base combinations for the given data.

(3a)—Select a vehicle, sensor and base combination from the set of combinations defined in (2f).

(3b)—Execute an optimization routine to establish a time-distance solution defining an optimal number of trips with routes for the vehicle, sensor and base combination selected in (3a).

(3c)—Apply financial parameters (stemming from operator practices or due to prevailing cost models) to the time-distance solution produced by block (3a) above. The complete solution can be stored in a table or other computer data structure and can be used later for comparative purposes.

(4)—Repeat the operations of blocks (3a) and (3b) and (3c) for additional vehicle, sensor and base combinations in the set of combinations defined in (2f).

(5)—When all of the vehicle, sensor and base combinations in the set of combinations defined in (2f) have been processed, continue to block vi) of the workflow described above.

In one or more embodiments, in the flight path planning described herein, the set of desired facilities or structures within the one or more facilities can be given equiprobable weighting with regard to scan priority. That is, each facility or structure within the one or more facilities can be given a uniform priority and can be equally likely to be selected when constructing the optimal flight paths. In some embodiments, a preference can be selected for scan order based on risk assessment, facility condition, elapsed time since a last manual check, or some other priority set. The output could be a measure for scan priority ranging from zero to one, with a low value indicating that an associated scan is not as important as a higher value and a value of one can indicate that an associated scan can be very important. Accordingly, priority measures can be considered in the optimal flight path planning workflow.

Placing a priority on a dispersed set of one or more facilities or structures within the one or more facilities over a large domain can impair the optimality of a generated flight path. That is, the total time and distance can increase in order to meet the priority measures assigned. For this reason, scanning targets with priority can be planned as follows:

(1)—Negate priority and scan all the one or more facilities or one or more structures within the one or more facilities with the optimal flight paths generated.

(2)—Use the priority measure to further filter the set of one or more facilities or one or more structures within the one or more facilities reachable from any one base, a priority measure partition, such that all the one or more facilities or one or more structures within the one or more facilities with similar priorities can be in the same pool and in the same collection of routes. The number of flights and the performance can be dictated by the dispersion of the one or more facilities or one or more structures within the one or more facilities in each flight plan. The choice for the priority measure partition can be user defined.

(3)—Use the priority measure to explicitly modify the objective measure such that high priority facilities or structures within the one or more facilities can be selected over lesser facilities or structures within the one or more facilities in the flight path planning. For example, incorporation of a penalty measure that accounts for the number of facilities or structures within the one or more facilities selected before higher value facilities or structures within the one or more facilities in any flight path plan. Hence, each route can be constructed with the selection of higher value facilities or structures within the one or more facilities in preference to lower ones.

Accordingly, priority can be included. For a layered solution for emission monitoring, satellite data from GHGSat can be used to derive a list of the one or more facilities or one or more structures within the one or more facilities that need closer inspection and priority measures can be used to scan the one or more facilities or one or more structures within the one or more facilities based on the list of facilities or structures within the one or more facilities.

In one or more embodiments, the flight path planning workflow can alter the flight level for a given flight path with some variation in aerial sensor performance. For example, the flight vehicle flying height can be adjusted to some higher level (increase potential sensor swath at lower accuracy) or made lower (to reduce sensor swath but increase detection accuracy). In either case, optimal flight paths can be constructed given the prevailing flight characteristics (resulting sensor swath, safe scan speed, etc.) with due change in detection capability suitably noted.

The flight vehicle flying height can be adjusted dynamically based on wind speed and direction. For example, the accuracy of airborne LiDAR measurements can decrease with increased windspeed according to known relationships. If the wind speed at the time of a flight is high, the flight altitude can be lowered such that the LiDAR measurement accuracy can be unchanged. The wind speed could be measured by one or more ground sensors, could be inferred from the measured shape of a detected emission plume, or could be imported from weather stations or local weather predictions. Changing the flight vehicle flying height will change the sensor swath as well as the sensitivity. A drone can be programmed to perform a pre-defined optimal search pattern over the list of the one or more facilities or one or more structures within the one or more facilities.

The flight path planning workflow can be applicable to other vehicle, sensor and/or surveillance problems. For example, an underwater autonomous vehicle (UAV) tasked with sub-sea facility investigation for leaks and maintenance can be utilized. Additionally, one or more sensors can be mounted on autonomous one or more ground-based platforms such as vehicles or robots, e.g., the Boston Dynamics robot dog Spot. Other examples include landfill leak gas detection, petro-chemical plant investigation, and general domain surveillance with thermal, optical gas imaging, visual or other gas sensors, and the like. The domain can be small or large by need, and the optimal combination of vehicle and sensor can be realized to minimize the total scan cost over all designated the one or more facilities or one or more structures within the one or more facilities with the generation of optimal flight paths as per the workflow described herein.

Optimizations Employing Hierarchical (Multi-Level) Clustering and Vehicle Routing Problem (VRP) Solver In one or more embodiments, the optimization routine of block (3b) uses a hierarchical (multi-level) clustering method to group the facilities into one or more clusters of facilities, or one or more clusters of structures within one or more facilities that can be associated with the particular base of the vehicle-sensor-base combination under consideration. As the number of clusters cannot be known a priori, the routine can be applied by iteration.

At each iteration, any number up to the maximum designated clusters can be identified. The effective scan area of each cluster can be evaluated and any cluster that exceeds a distance limit (or time limit) of the designated vehicle-sensor combination can be flagged for subsequent sub-clustering. Subsequently, second-level clustering ensures that each identified cluster group is within operating limits of the designated vehicle-sensor combination. In other words, if a flight vehicle arrives at any target site (a cluster center), it will be able to perform the scan of the one or more facilities or structures of the cluster within operating limits. Note that the clustering method can identify the location of the centers of the clusters. Each facility within a cluster can be assigned an error measure based on least distance to the cluster center.

The clusters generated by the second-level clustering represent groups of facilities or structures within the one or more facilities in the absence of any designated base. Thus, in a third-level clustering, each facility or structure within a cluster can be evaluated with respect to the base location for the particular base of the vehicle-sensor-base combination under consideration and marked as either feasible or infeasible. A feasible cluster is one that can be reached from the stipulated base location, permits scanning of all the facilities of the cluster as per requirements by cluster size (given by the underlying facilities and resulting scan area), and finally ensures that the flight vehicle is able to return to the stipulated base location, all within safe operating margins. Any cluster that does not satisfy the constraints of the feasible cluster is marked as an infeasible cluster. The third-level clustering can then be reapplied to any infeasible cluster resulting in sub-cluster groups, possibly, down to an individual facility or structure within the one or more facilities, if necessary. Those the one or more facilities or one or more structures within the one or more facilities that cannot be reached can be discarded as 'unattainable' by definition for the vehicle-sensor-base combination under consideration.

Furthermore, the feasible clusters can be parsed by some user-defined measure (e.g., as a function of site scan area, well density, structure density, or some other measure) to enforce a further sub-clustering requirement. When the hierarchical clustering process completes, it will result in a set of desired and feasible facility and/or structure clusters for the given vehicle-sensor-base combination under consideration, and no further clustering levels can be warranted.

In one or more embodiments, the effective cluster center for the feasible facility clusters can be calculated. For example, the effective cluster center for a given facility cluster can be derived as the center-of-mass of the facilities or structures that belong to the given cluster. This ensures that the cluster center resides within the scan area in case of sub-optimality in the clustering procedure.

The result of the hierarchical clustering method can be data that represents a set of clusters of associated facilities or structures within the one or more facilities for the given vehicle-sensor-base combination under consideration. These results, together with the data representing flight vehicle, sensor and base combination, results in a vehicle routing problem (VRP). That is, how many trips are required from the given starting location of the base to serve each facility or structure belonging to the set of clusters and then returning to the same base location. Note that a dedicated VRP solver can be used to address this problem with vehicle range limits imposed as capacity constraints. The anticipated costs can be embedded as costs in the VRP graph with respect to the end node in the given leg. Similarly, no-fly zone restrictions can be added directly as penalties to the non-compliant edges in the graph at the outset. The VRP solver then will yield the optimal number of trips along with their anticipated routes to minimize the overall time or distance measure (as a cost of the entire process). Note that as a flight vehicle can be deemed to travel to a cluster at cruise speed but undertakes scan operations of the one or more facilities or structures of the cluster at scan speed, cumulative time can be a good measure to use that also allows ready consideration of vehicle total hire time. However, distance, or some other metric, could also be used for performance purposes.

With respect to the optimization routine of block (3a) described above, several points can be worthy of elaboration.

First, a large dataset (e.g., one comprising tens of thousands of well sites) necessarily leads to a great computation cost and effort in establishing a clustering and routing solution, as per the method described above. Thus, it can be expedient to partition the facilities of the dataset by assignment to the nearest base location a priori. However, if the resulting data set is still very large, a spatial partitioning procedure can be applied within the locality of the given base. That is, the one or more facilities or one or more structures within the one or more facilities can be sub-partitioned by quadrant or more generally, by some fraction of the angle between set bounds, that includes the density measure of the facilities held within each region. Each sub-problem can be solved independently, with the collective solution given by the set of all sub-solutions for that given base.

In some instances, partitioning facility or structures data by assignment to the nearest base can be inefficient if certain bases result in the assignment of a few facilities or structures within the one or more facilities. This can mean that in the operational implementation, the vehicle and/or crew must move to a new base (at some cost) to target the remaining facilities or structures. However, rather than incur this cost, it may be more conducive (economic) to fly from a more heavily-used base, albeit with longer flight incursions. In that regard, an alternative procedure can be used whereby a base can be selected in order of facility assignments, and all facilities that can be reached from that base can be completed before moving to the next base on the list. For bases that must be used, the facilities can be re-assigned by nearest base, while those bases which had a few target facilities that were successfully fielded by a more significant base location can now be omitted from the planning process. The plans can be re-optimized for the set of selected bases with facility assignment and/or assignment of structures within the one or more facilities to the nearest base location.

Lastly, it should be clear that the clusters can include a number of underlying facilities and/or structures within the one or more facilities. The area defined by this collection can dictate the scan area of the cluster. The optimization problem then involves establishing a flight pattern to cover the scan area of each cluster. This can be done directly by solving a cluster cover optimization problem at each-and-every cluster or more expediently, using a template design that provides a quick solution. The latter involves the use of a set flight pattern (or template scan pattern) around the facilities of the cluster such that the designated scan area is implicitly covered including all desired facilities of the cluster as shown in FIG. 2. The template scan pattern may not be as efficient as a rigorous site optimization scheme due to the distribution of facilities, i.e., the flight pattern may unnecessarily, and undesirably, include dead-space where no facilities are located. This issue can be mitigated by limiting the maximum scan area to some extent. Nonetheless, an advantage of using the template scan pattern can be fast computation, along with the fact that the template scan pattern is more likely to be used in practice. For example, a "wing-over" template scan pattern in which a pilot flies linearly over a rectangular field but makes a fast-rising pull-out turn to the right before performing an altitude dropping 180 degree turn to get back in-line with the field on the return pass. This procedure can be repeated until the rectangular field has been fully scanned (or sprayed) over multiple passes as shown in FIG. 2. Similarly, another type of template scan pattern can use the notion of hair-pin turns at fixed altitude, but with the same intention to cover a rectangular field with the fewest number of passes. The workflows described herein can use any given template scan pattern design, or undertake a rigorous site optimization, such that the time and distance values to complete the site scan over the designated area (encompassing all underlying facilities) can be provided as an outcome. These measures can be anticipated by the hierarchical clustering method and consequently can be used in the vehicle routing problem as described above.

Figure 1B:
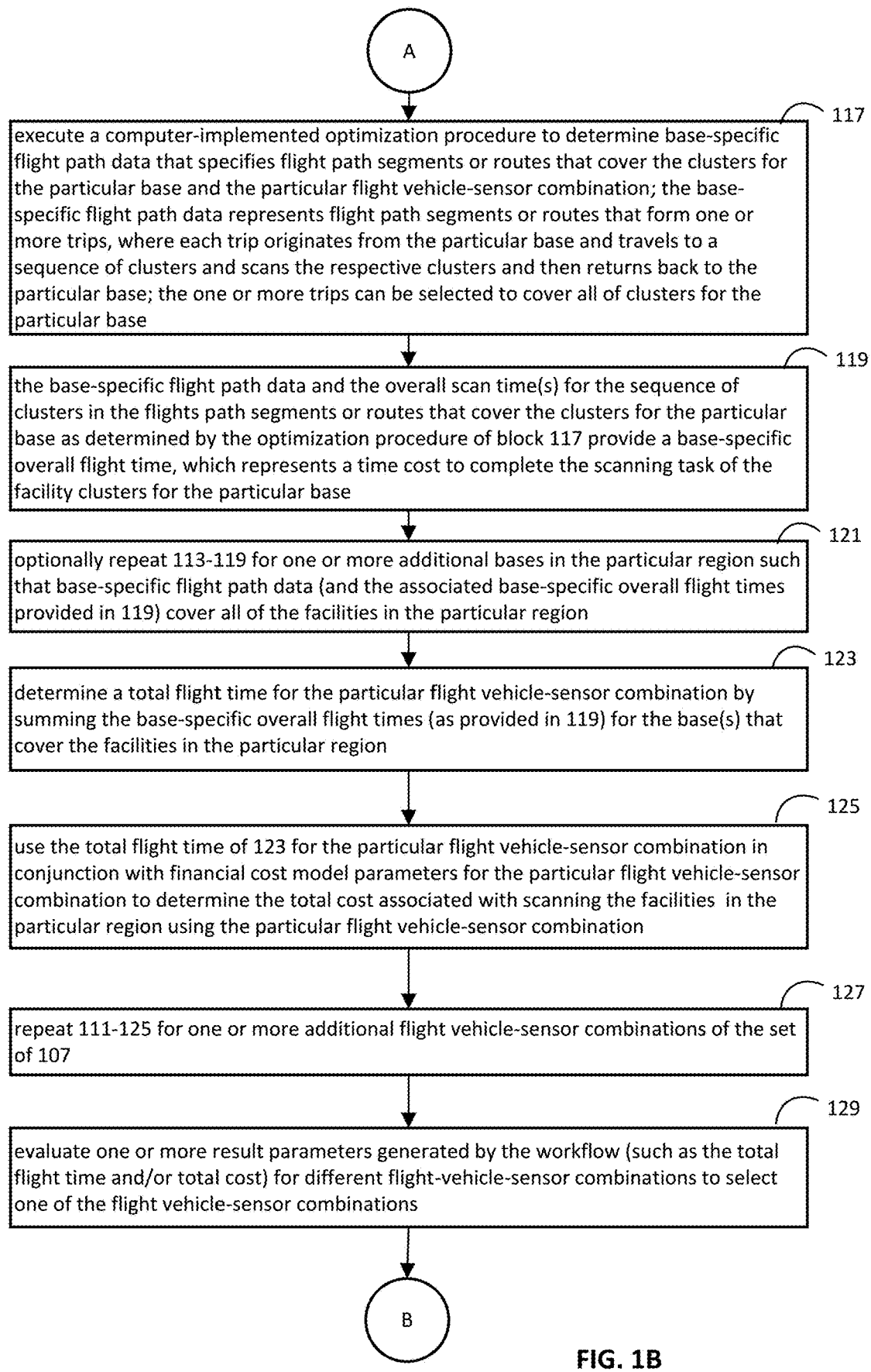
Figure 1C:
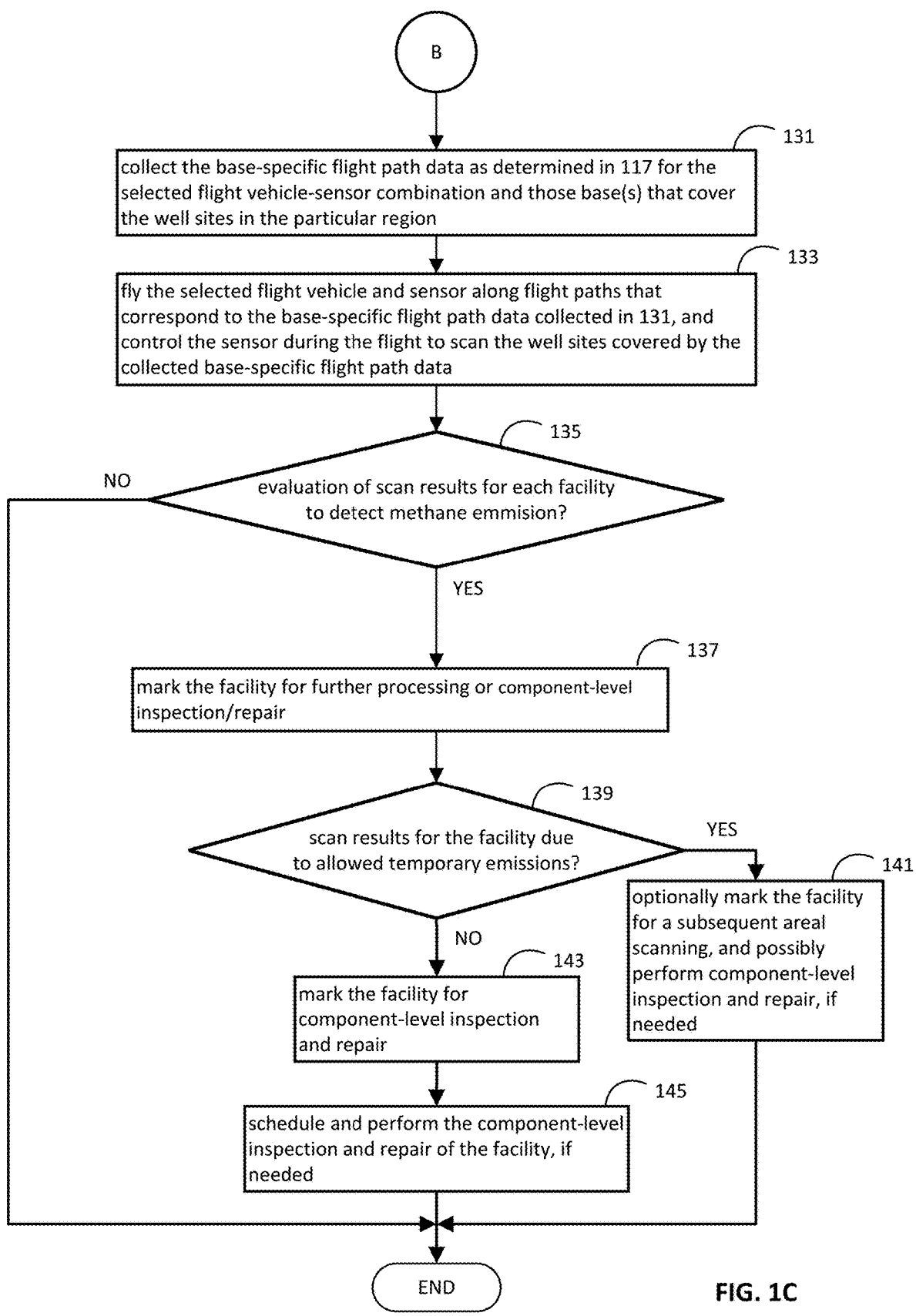

FIGS. 1A-1C is a flowchart that illustrates another exemplary workflow that deploys the one or more airborne sensors to monitor and detect fugitive emissions in the upstream oil and gas sector.

In block 101, flight vehicle data can be collected and stored. The flight vehicle data can represent operational parameters for one or more flight vehicles. For example, the flight vehicle data can define a set of vehicles V, where a particular vehicle V includes the following parameters: name, cruise speed (kmph), fuel burn rate (per hour), fuel capacity, turn rate (hours), and possible other operating limits.

In block 103, sensor data can be collected and stored. The sensor data can represent operational parameters for the one or more airborne sensors. For example, the sensor data can define a set of one or more airborne sensors S, where a particular sensor S includes the following parameters: name, scan swath (km), scan speed (kmph), scan radius (km), weight, cost, deployment restrictions (such as wind speed), limit of detection, and possibly other parameters.

In block 105, region data can be collected and stored. The region data represents one or more bases (e.g., airports, platforms, or landing sites), one or more facilities and/or structures within the one or more facilities (e.g., well sites, compression stations, and/or other distributed facilities and/or structures that can be potential sources of fugitive emission) and corresponding facility and/or structures locations, and optionally a set of constraints. For example, the region data can define a set of regions R, where a particular region R comprises the list of all facilities F in the region, a list of available bases B in the region, and a set of constraints C for the region. Each well F in F can include a unique identification number for the facility and a location for the facility in the cartesian coordinate system of R. Similarly, each base B in B can include a name, location and possible operating limits. The set of constraints C defines no fly-zones, restrictions, or other operating limitations in R, where each constraint C in C can be expressed as an exclusion by rectangular, circular or linear defined bounds.

In block 107, a set of possible flight vehicle-sensor combinations is defined according to the flight vehicle data and the sensor data. For example, a set of possible vehicle-sensor combinations U can be defined, where a particular vehicle-sensor combination U comprises a valid vehicle V and sensor S pair.

In block 109, a particular region as represented by the region data as well as a particular flight vehicle-sensor combination of the set of block 107 can be selected or specified. Such selections can be based on user input or automatically by software instructions.

In block 111, the region data can be processed to identify a list of facilities for each base in the particular region of 109, wherein the facilities for a given base can be served from the given base. In one or more embodiments, the processing of block 111 can involve using the region data collected and stored in block 105 to initialize a set of facilities F, a set of bases B and a set of constraints C for a region R as selected in 109. The set of facilities F can be filtered according to an operator selection list to give a filtered set of facilities Ff. This set can be further filtered for each base B in B, giving a set of facilities $F_B$ that include those facilities that can be located nearest to B and should therefore be preferentially served from that base B. For a very dense data-set, the set of facilities $F_B$ can be further partitioned by quadrant (or some other means) yielding a collection of sets $\{F_{B1}, F_{B2}, \ldots, F_{Bk}\}$ for $k \in \{1, \ldots, K\}$ that can be managed from the base B, collectively ensuring that all (reachable) facilities in $F_B$ can be covered.

In block 113, a particular base that is located within the particular region of 109 is selected or specified. Such selection can be based on user input or automatically by software instructions.

In block 115, a computer-implemented optimization procedure can be executed to determine data representing clusters of facilities or structures that correspond to the particular base of 113. Each cluster includes a set of one or more facilities or one or more structures within the one or more facilities that belong to the filtered set of facilities of 111 for the particular base. The optimization procedure can also determine the scan area for each cluster and corresponding overall scan time for each cluster.

In one or more embodiments, the optimization procedure of block 115 can be performed for a given vehicle V, sensor S, base B, set of facilities $F_{Bk}$ (specified generally as D) for the base B, and the set of constraints C as follows. First, a clustering procedure is applied to the set D to identify a number of facility clusters (or target-sites). As the number of anticipated clusters is not known a priori, the procedure is applied for a given number of clusters (n) as follows:

$$\min \quad M(X|D) \qquad \text{Eqn. (1)}$$
$$\text{s.t.} \quad d_{min} - \|x_i - x_j\| \le 0$$
$$x_L \le x_i, x_j \le x_U$$
$$i, j = \{1, 2, \ldots, n\}$$

where, X is the set of clusters ($\in \mathbb{R}^{2n}$), $d_{min}$ is the minimum permissible distance between any two cluster centers $x_i$ and $x_j$ ($\in \mathbb{R}^2$) with lower and upper bounds $x_L$ and $x_U$ respectively, and M is the collective measure of total distance of each of them samples $d_j$ in D (with $j=\{1, 2, \ldots, m\}$) to its nearest cluster center, $x_j^{min} = \min\{\|d_j - x_i\|\}$ for all $i = \{1, 2, \ldots, n\}$, defined as:

$$M(X|D) = \Sigma_{j=1}^m \|d_j - x_j^{min}\| \qquad \text{Eqn. (2)}$$

The set of candidate clusters X is filtered of any clusters with zero facility assignments to give the set of target clusters $C_L$ of size c.

Then for each cluster in the set $C_L$, the cluster center can be determined as the center of mass of the prevailing sample set d (those facilities and/or structures assigned to the cluster). In addition, the lower-left and the upper-right points that define the bounding set of the facilities and/or structures in the cluster (including a buffer in consideration of site scan radius) can be used to estimate the scan area of each cluster in the set $C_L$. The center-of-mass of a given cluster in the set $C_L$ can be determined in the cartesian XY coordinate system of the particular region in which they are located. Specifically, the X-coordinate of the cluster center of mass can be determined by dividing the sum of the X-coordinates of the facility locations of the cluster by the number of facility locations in the cluster, and the Y-coordinate of the cluster center of mass can be determined by dividing the sum of the Y-coordinates of the facility locations of the cluster by the number of facility locations in the cluster.

The width ($l_x$) and height ($l_y$) of the bounded region, along with the properties of the vehicle V (Cruise Speed, Turn Time) and sensor S (Scan Swath and Scan Speed) can then be used to infer the time required to scan each cluster (in hours):

$$T_s = f(l_x, l_y, V, S) \qquad \text{Eqn. (3)}$$

As the regular bound does not ensure least area, the bound set can be optimized to give the minimum expected scan time, defined as follows:

$$\min \ S(P, Q, w|d) \quad \text{Eqn. (4)}$$

s.t. point $d_i$ is within bounds $(P, Q, w)$ distance of $di$ to nearest point on each bound > Site Radius $i = \{1, 2, \ldots, I\}$ is the index of facilities in $d$ $x_L \leq P, Q \leq x_U$ are points $(\in \mathbb{R}^2)$ in region $R$ $w_{min} \leq w \leq w_{max}$ where, $w_{min}$ = Site Radius (km)

Here, the control variable set $\{P, Q, w\}$ ($\in \mathbb{R}^5$) defines the location of a point P that connects to a point Q with orthogonal bounds of width w. Hence, P, Q and w, define a bound set (points P, Q, R and S) around the facilities d in the given cluster C. The solution of this problem can be the least scan time required to cover the bound set defined by points P, Q, R and S. This procedure can be applied to each one of the c clusters in $C_L$. That is, each cluster in $C_L$ has a designated site scan cost in terms of time (hours) once evaluated. This information can be important, as subsequently the costs (of each cluster group) can be imposed as the target node costs in the vehicle routing problem (block 117).

Any cluster that exceeds the vehicle-sensor imposed area or time limit can be flagged for further sub-clustering. That is, a second-level of clustering can be applied to ensure that each identified cluster can be within operating limits of the vehicle V—sensor S combination. That is, if the vehicle V arrives at the target site (a cluster center), it can perform the scan of the facilities of the cluster within its operating limits and return to the base, e.g., the time to travel to-and-from the base to the cluster center plus site scan cost must be less than $T_{max}$, the maximum vehicle flying time (fuel capacity divided by fuel burn rate). This second level of clustering can be performed on the cluster groups using the same procedure described above. The final set of target clusters $C_L$ of size c can be updated accordingly.

Note that zero or more facilities that cannot be reached within the operational constraints of the vehicle V—sensor S combination under consideration can be marked as 'unattainable' and discarded from the facilities that will be scanned. In this case, each unattainable facility can be inspected by other methods, such as by a physical inspection similar to block 145 as described below. If this inspection detects and locates fugitive methane emission, the location of the leak can be repaired as described in block 145 below.

In block 117, a computer-implemented optimization procedure can be executed to determine base-specific flight path data that specifies flight path segments or routes that cover the facility clusters for the particular base of 113 and the particular flight vehicle-sensor combination of 107. The base-specific flight path data represents flight path segments or routes that form one or more trips where each trip originates from the particular base and travels to a sequence of facility clusters and scans the respective facility clusters and then returns back to the particular base. The flight path segments or routes for the one or more trips can be selected to cover the facility clusters for the particular base.

In one or more embodiments, the optimization procedure of 117 can be formulated as a capacitated vehicle routing problem (VRP) for the collection of target-sites (the target clusters $C_L$) that can be produced by block 115. That is, how many trips are required from the starting base B to serve each cluster in the set $C_L$ and then return to the same base B within the total flying time of the vehicle. A suitable VRP solver (such as one following the Unified Tabu Search method described by Cordeau et al. in "A unified tabu search heuristic for vehicle routing problems with time windows", Journal of the Operational Research Society (2001) 52, 928-936) can be used to address this problem. The VRP solver typically employs a definitive graph with vertices and associated vertex costs, edges between vertices and associated edge costs as well as capacity constraints. In one or more embodiments, the facility and/or structure clusters that can be produced by block 115 can define the vertices of the graph, the time to travel between target sites (clusters) (which can be determined from the vehicle cruising speed) can define the edge costs in the graph, the scan times for scanning the one or more facilities in the clusters (which can be determined from the area of the cluster and the vehicle scan speed and other operational parameters of the vehicle and airborne sensor) can define the vertex costs in the graph, and vehicle range limits can define capacity constraints. Similarly, no-fly zone restrictions and other limitations stipulated by the constraint set $C_L$ can be added as penalties on the non-compliant edges from the outset. The VRP problem can be stated in general terms as:

$$\min \ W = VRP(Y|C_L, V, S, B, C) \quad \text{Eqn. (5)}$$

where, Y represents a set of routes (flight paths) each comprising a sequence of facility visits by index with design merit value W, $C_L$ is the set of target clusters with determined scan time costs, V represents the vehicle, S is the sensor, B is the base and C is the set of constraints.

A cost matrix can be used to establish the edge costs (in terms of time) from the base or target site (cluster) to any other target site or base. The VRP solution Y, will yield the optimal number of trips along with their flight segments (routes) that minimize the overall time (and therefore distance) as a measure of the cost to complete the scanning task of the set of target clusters $C_L$ with vehicle V fitted with sensor S from base B.

Note that as a vehicle is deemed to travel to target sites (clusters) at vehicle cruising speed but undertakes scan operations of the one or more facilities within a cluster at vehicle scan speed, cumulative time can be used as the measure of performance that also allows consideration of vehicle total hire time. However, distance, or some other metric, could also be used. Financial parameters (stemming from operator practices or due to prevailing cost models) can be applied to the (time-distance) solution produced by the optimization procedure above (block 125). The complete solution can be stored in a table or other data structure and can be accessed later for comparative purposes for different vehicle and sensor combinations (block 129).

In block 119, the base-specific flight path data and the overall scan time(s) for the sequence of clusters in the flights paths determined by the optimization procedure of block 117 provide a base-specific overall flight time, which represents the time cost to complete the scanning task of the facility and/or structure clusters for the particular base.

In optional block 121, the operations of 113-119 can be repeated for one or more additional bases in the particular region such that base-specific flight path data (and the associated base-specific overall flight times provided in 119) cover all of the facilities in the particular region of 109.

In block 123, a total flight time for the particular flight vehicle-sensor combination of 107 can be determined by summing the base-specific overall flight times (as provided in 119) for the base(s) that cover the facilities in the particular region of 109.

In block 125, the total flight time of 123 for the particular flight vehicle-sensor combination and financial cost model parameters for the particular flight vehicle-sensor combination can be used to determine the total cost associated with scanning the facilities in the particular region of 109 using the particular flight vehicle-sensor combination of 107.

In block 127, the operations of 111-125 can be repeated for one or more additional flight vehicle-sensor combinations of the set of 107.

In block 129, one or more result parameters generated by the workflow (such as the total flight time and/or total cost) for different flight vehicle-sensor combinations can be evaluated to select one of the flight vehicle-sensor combinations of the set of 107. For example, it can be contemplated that the flight vehicle-sensor combination selected in 129 has the lowest total flight time or lowest total cost as compared to the other flight vehicle-sensor combination in the set of 107.

In block 131, the base-specific flight path data as determined in 117 for the flight vehicle-sensor combination selected in 129 and those base(s) that cover the facilities in the particular region of 109 can be collected.

In block 133, the flight vehicle and sensor selected in 129 can be flown along flight paths (routes) that correspond to the base-specific flight path data collected in 131, and the sensor can be controlled during the flight to scan the facilities covered by the collected base-specific flight path data.

In block 135, the scan results for each facility can be evaluated to detect methane emission. If methane emission is detected in block 135, the operations continue to block 137. Otherwise, the operations end for that facility.

In block 137, the facility can be marked for further processing or component-level inspection/repair.

In block 139, the scan results for the facility can be evaluated to determine if the detected methane emission is due to allowed emissions. For example, the time of the scanning of the facility can be evaluated to determine if it corresponds to time of known allowed emissions, such as liquid unloading. If the detected methane emission is due to allowed temporary, the operations continue to block 141; if not, the operations continue to block 143.

In block 141, the facility can be marked for a subsequent aerial scan and possibly perform component-level inspection and repair, if needed.

In block 143, the facility can be marked for component-level inspection and repair.

In block 145, the component-level inspection of the facility can be scheduled and performed, and repair of the component(s) or equipment of the facility can be performed if need be to mitigate fugitive methane emission from the facility. The component-level inspection can involve inspection of valves, flanges, tanks or other equipment or other components of the facility. In one or more embodiments, the component-level inspection of block 145 can utilize portable technology that can effectively identify and locate fugitive emissions, such as a gas sniffer or an optical gas imager or other sensors. The repair of the equipment of the facility can use standard best practices. Optionally, the quality of the repair can be verified by inspecting the repaired equipment. In one or more embodiments, the same portable technology used for the component-level inspection can be used to validate and verify the leak mitigation provided by the repaired equipment.

FIG. 2 illustrates an exemplary flight path planning solution produced as a result of the workflows described herein. The depicted flight path planning solution can be provided for scanning a set of facilities and/or structures within the one or more facilities (e.g., well sites) in the Permian Basin of Texas using Lubbock airport as a base. The well sites are shown as dots distributed over the map of the Permian Basin around the Lubbock airport. The flight path segments or routes of the solution are shown as edges/lines. The flight path segments form four different trips (labeled trip 1, trip 2, trip 3, and trip 4) that originate and terminate at Lubbock airport (base). A set of three clusters that are part of trip 3 is shown in the expanded view window on the right-hand side of the page. The clusters can be scanned by a scan pattern as shown in the expanded view window.

Note that various adaptations can be made to the workflows as described herein. For example, in carrying out the operations of the workflow of FIGS. 1A-1C, some or all of the optimization procedures described herein can be used to determine the optimal flight plan (flight path data) for the facility and/or structures within the one or more facilities scanning operations. In another example, if a particular airborne sensor is preferred, the workflow can be configured to optimize the selection of a flight vehicle (from number of possible flight vehicles) and the generation of the flight path that uses the selected flight vehicle and particular airborne sensor to scan the facilities of a desired region. In yet another example, if a particular flight vehicle is preferred, the workflow can be configured to optimize the selection of an airborne sensor (from the one or more airborne sensors) and the generation of the flight path that uses the particle flight vehicle and the selected airborne sensor to scan the facilities of a desired region. In still another example, if a particular flight vehicle-sensor combination is preferred, the workflow can be configured to optimize the generation of the flight path route that uses the particle flight vehicle—sensor combination to scan the facilities of a desired region. For example, such operations can involve the execution of blocks 111 to 121 of the workflow of FIGS. 1A-1C, while omitting operations (such as the iterative processing of blocks 123 to 129 over the possible flight vehicle—sensor combinations) that allow for selection of the optimal flight vehicle-sensor combination.

The description provided here focuses on emissions of natural gas from distributed upstream oil-gas facilities such as well sites, compressor stations, or other upstream facilities and or structures within the one or more facilities. However, the workflow can readily be adapted to plan aerial scanning for methane detection in or other oilfield equipment, including equipment in the midstream and downstream sectors, including at any point in delivery of gas or other products up to the point of use.

Some of the methods and processes described above, can be performed by a processor. The term "processor" should not be construed to limit the embodiments disclosed herein to any particular device type or system. The processor can include a computer system. The computer system can also include a computer processor (e.g., a microprocessor, microcontroller, digital signal processor, or general-purpose computer) for executing any of the methods and processes described above.

The computer system can further include a memory such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

Some of the methods and processes described above, can be implemented as computer program logic for use with the computer processor. The computer program logic can be embodied in various forms, including a source code form or a computer executable form. Source code can include a series of computer program instructions in a variety of programming languages (e.g., an object code, an assembly language, or a high-level language such as C, C++, or JAVA). Such computer instructions can be stored in a non-transitory computer readable medium (e.g., memory) and executed by the computer processor. The computer instructions can be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Alternatively or additionally, the processor can include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

Figure 3:
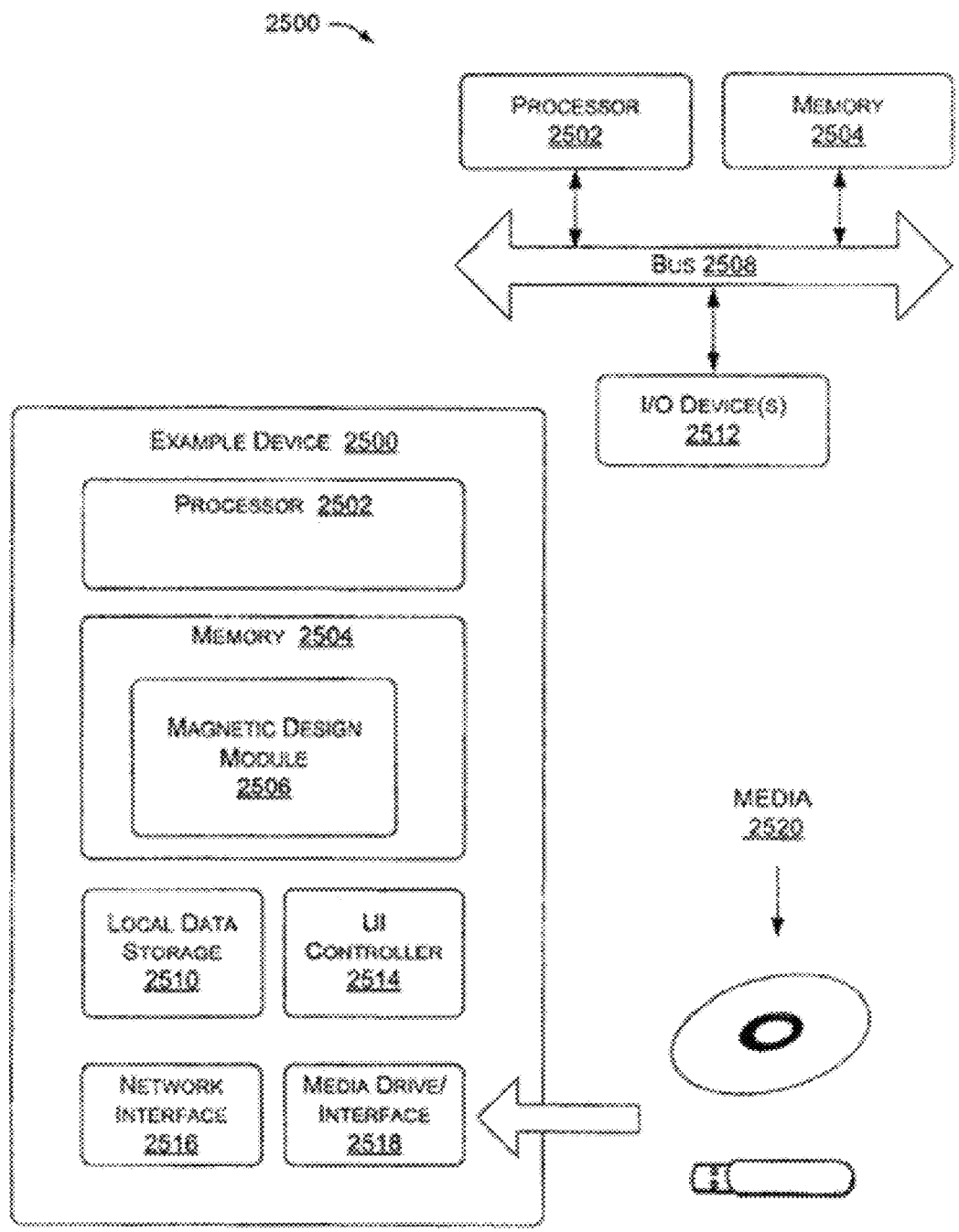
FIG. 3 illustrates an example computing device that can be used to embody parts of the workflow of the present disclosure.

FIG. 3 illustrates an example device 2500, with a processor 2502 and memory 2504 that can be configured to implement various parts of the workflows and methods discussed in this disclosure. Memory 2504 can also host one or more databases and can include one or more forms of volatile data storage media such as random-access memory (RAM), and/or one or more forms of nonvolatile storage media (such as read-only memory (ROM), flash memory, and so forth).

Device 2500 is one example of a computing device or programmable device, and is not intended to suggest any limitation as to scope of use or functionality of device 2500 and/or its possible architectures. For example, device 2500 can comprise one or more computing devices, programmable logic controllers (PLCs), etc.

Further, device 2500 should not be interpreted as having any dependency relating to one or a combination of components illustrated in device 2500. For example, device 2500 can include one or more of a computer, such as a laptop computer, a desktop computer, a mainframe computer, etc., or any combination or accumulation thereof.

Device 2500 can also include a bus 2508 configured to allow various components and devices, such as processors 2502, memory 2504, and local data storage 2510, among other components, to communicate with each other.

Bus 2508 can include one or more of any of several types of bus structures, including a memory bus or memory controller, a peripheral bus, an accelerated graphics port, and a processor or local bus using any of a variety of bus architectures. Bus 2508 can also include wired and/or wireless buses.

Local data storage 2510 can include fixed media (e.g., RAM, ROM, a fixed hard drive, etc.) as well as removable media (e.g., a flash memory drive, a removable hard drive, optical disks, magnetic disks, and so forth).

One or more input/output (I/O) device(s) 2512 can also communicate via a user interface (UI) controller 2514, which can connect with I/O device(s) 2512 either directly or through bus 2508.

In one possible implementation, a network interface 2516 can communicate outside of device 2500 via a connected network.

A media drive/interface 2518 can accept removable tangible media 2520, such as flash drives, optical disks, removable hard drives, software products, etc. In one possible implementation, logic, computing instructions, and/or software programs comprising elements of module 2506 can reside on removable media 2520 readable by media drive/interface 2518.

In one possible embodiment, input/output device(s) 2512 can allow a user to enter commands and information to device 2500, and also allow information to be presented to the user and/or other components or devices. Examples of input device(s) 2512 include, for example, sensors, a keyboard, a cursor control device (e.g., a mouse), a microphone, a scanner, and any other input devices known in the art. Examples of output devices include a display device (e.g., a monitor or projector), speakers, a printer, a network card, and so on.

Various processes of the present disclosure can be described herein in the general context of software or program modules, or the techniques and modules can be implemented in pure computing hardware. Software generally includes routines, programs, objects, components, data structures, and so forth that perform particular tasks or implement particular abstract data types. An implementation of these modules and techniques can be stored on or transmitted across some form of tangible computer-readable media. Computer-readable media can be any available data storage medium or media that is tangible and can be accessed by a computing device. Computer readable media can thus comprise computer storage media. "Computer storage media" designates tangible media, and includes volatile and non-volatile, removable and non-removable tangible media implemented for storage of information such as computer readable instructions, data structures, program modules, or other data. Computer memory includes, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, computer storage media or any other tangible medium which can be used to store the desired information and data structures of the methods and workflows as described herein, and which can be accessed by a computer executing the operations of the methods and workflows as described herein.

The workflows and related data processing systems as described herein provide for flight path route planning for aerial detection (using one or more airborne sensors mounted on flight vehicles). The aerial detection can be configured for remote detection of methane emission sources at distributed facilities. In other embodiments, the aerial detection can be configured for remote detection of emission sources other than methane, for aerial photography (using visual or other parts of the EM spectrum), etc. That is, the method can be applicable in cases where surveys are possible with one or more suitable airborne sensors, and does not limit the subsequent investigation step, if desired.

Although only a few examples have been described in detail above, those skilled in the art will readily appreciate that many modifications can be possible in the examples without materially departing from this subject disclosure. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw can be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A method for aerial inspection of structures for gas emissions, the method comprising:
   storing, in memory, aerial inspection data including:
      data of at least one of: locations of a plurality of structures within a plurality of potential gas emission facilities, or a gas emission scanning area associated with the plurality of gas emission facilities, the plurality of potential gas emission facilities including at least one of: one or more well sites, one or more compressor stations, one or more oil refineries, one or more petrochemical plants, one or more petroleum products distributors, one or more petrochemical retail outlets, one or more pipelines, or natural gas distribution facilities;
      data of locations of one or more bases, wherein the one or more bases comprise available departure points for the aerial inspection for the gas emissions;
      data of a plurality of available flight vehicles and one or more operational capabilities of the plurality of available flight vehicles, the one or more operational capabilities including at least one of: a speed, a fuel consumption rate, a fuel capacity, or a turn rate of the plurality of available flight vehicles; and
      data of a plurality of available gas emission detection sensors and one or more operational capabilities of the plurality of available gas emission detection sensors, the operational capabilities of the plurality of available gas emission detection sensors including at least one of: a scan swath, a scan speed, a scan radius, a deployment restriction, or a detection limit of the plurality of available gas emission detection sensors;
   determining, by one or more processors, first feasible groups of the plurality of structures iteratively by, for pairs of a flight vehicle, of the plurality of available flight vehicles, and a gas emission detection sensor of the plurality of available gas emission detection sensors:
      determining, using the aerial inspection data, a respective group of structures as feasible when a respective gas emission scanning area for the respective group of structures is below a respective gas emission scanning area limit for the respective pair of the flight vehicle and the gas emission detection sensor; and
      when the respective gas emission scanning area for the respective group of structures is at or above the respective gas emission scanning area limit for the respective pair of the flight vehicle and the gas emission detection sensor:
         determining the respective group of structures as infeasible;
         determining one or more subgroups of the respective group of structures; and
         determining whether each of the one or more subgroups is a first feasible group by determining, for each of the one or more subgroups, whether a gas emission scanning area for the subgroup is below the respective gas emission scanning area limit for the respective pair of the flight vehicle and the gas emission detection sensor;
   determining, by the one or more processors, second feasible groups of the plurality of structures iteratively by, for a plurality of combinations of a base, of the plurality of bases, and a pair of the pairs of flight vehicle and gas emission detection sensor:
      determining, using the aerial inspection data, a respective combination of the plurality of combinations as a second feasible group when the respective combination is capable of a trip to aerially inspect a respective first feasible group of the plurality of structures, the trip comprising:
         travelling, by the respective flight vehicle from the respective base, to a center of the respective first feasible group of the plurality of structures;
         scanning, with the respective gas emission detection sensor, each structure of the respective first feasible group of the plurality of structures; and
         returning to the respective base; and
      when the respective combination is incapable of the trip to aerially inspect the respective first feasible group of the plurality of structures:
         determining one or more subgroups of the first feasible group; and
         determining whether each of the one or more subgroups is a second feasible group by determining whether the respective combination is capable of a trip to aerially inspect each respective subgroup;
   selecting, by the one or more processors, one of the plurality of combinations;
   determining, by the one or more processors, flight path data representing flight path segments that form a trip to inspect, using the selected combination of base, flight vehicle, and gas emission detection sensor, one or more second feasible groups of structures, wherein the flight path data includes a sequence of structures of the one or more second groups of structures to scan, and wherein the flight path data is determined by minimizing flight time costs for the trip; and
   executing the trip based on the determined flight path data, wherein executing the trip comprises:
      dispatching the flight vehicle of the selected combination, equipped with the gas emission detection sensor of the selected combination, from the base of the selected combination;
      aerially inspecting, by the flight vehicle using the gas emission detection sensor, the sequence of structures of the one or more second groups of structures; and
      returning the flight vehicle to the base.

2. The method of claim 1, wherein determining the flight path data uses a computer-implemented vehicle routing problem (VRP) solver.

3. The method of claim 1, further comprising generating a map of the plurality of structures within the plurality of potential gas emission facilities.

4. The method of claim 1, wherein the plurality of gas emission detection sensors are configured to detect at least one of: methane ($CH_4$), carbon-dioxide ($CO_2$), hydrogen sulfide ($H_2S$), hydrogen disulfide ($H_2S_2$) sulphur dioxide ($SO_2$), chlorofluorocarbon (CFC), or hydrofluorocarbon (HFC).

5. An apparatus comprising:

computer memory storing aerial inspection data including:

data of at least one of: locations of a plurality of structures within a plurality of potential gas emission facilities, or a gas emission scanning area associated with the plurality of gas emission facilities, the plurality of potential gas emission facilities including at least one of: one or more well sites, one or more compressor stations, one or more oil refineries, one or more petrochemical plants, one or more petroleum products distributors, one or more petrochemical retail outlets, one or more pipelines, or natural gas distribution facilities;

data of locations of one or more bases, wherein the one or more base comprise available departure points for aerial inspection for gas emissions;

data of a plurality of available flight vehicles and one or more operational capabilities of the plurality of available flight vehicles, the one or more operational capabilities including at least one of: a speed, a fuel consumption rate, a fuel capacity, or a turn rate of the plurality of available flight vehicles; and data of a plurality of available gas emission detection sensors and one or more operational capabilities of the plurality of available gas emission detection sensors, the one or more operational capabilities of the plurality of available gas emission detection sensors including at least one of: a scan swath, a scan speed, a scan radius, a deployment restriction, or a detection limit of the plurality of available gas emission detection sensors; and at least one processor configured to:

determine first feasible groups of the plurality of structures iteratively by, for pairs of a flight vehicle, of the plurality of available flight vehicles, and a gas emission detection sensor of the plurality of available gas emission detection sensors:

determining, using the aerial inspection data, a respective group of structures as feasible when a respective gas emission scanning area for the respective group of structures is below a respective gas emission scanning area limit for the respective pair of the flight vehicle and the gas emission detection sensor; and when the respective gas emission scanning area for the respective group of structures is at or above the respective gas emission scanning area limit for the respective pair of the flight vehicle and the gas emission detection sensor:

determining the respective group of structures as infeasible;

determining one or more subgroups of the respective group of structures; and determining whether each of the one or more subgroups is a first feasible group by determining, for each of the one or more subgroups, whether a gas emission scanning area for the subgroup is below the respective gas emission scanning area limit for the respective pair of the flight vehicle and the gas emission detection sensor;

determining second feasible groups of the plurality of structures iteratively by, for a plurality of combinations of a base, of the plurality of bases, and a pair of the pairs of flight vehicle and gas emission detection sensor:

determining, using the aerial inspection data, a respective combination of the plurality of combinations as a second feasible group when the respective combination is capable of a trip to aerially inspect a respective first feasible group of the plurality of structures, the trip comprising:

travelling, by the respective flight vehicle from the respective base, to a center of the respective first feasible group of the plurality of structures;

scanning, with the respective gas emission detection sensor, each structure of the respective first feasible group of the plurality of structures; and returning to the respective base; and when the respective combination is incapable of the trip to aerially inspect the respective first feasible group of the plurality of structures:

determining one or more subgroups of the first feasible group; and determining whether each of the one or more subgroups is a second feasible group by determining whether the respective combination is capable of a trip to aerially inspect each respective subgroup;

select one of the plurality of combinations;

determine flight path data representing flight path segments that form a trip to inspect, using the selected combination of base, flight vehicle, and gas emission detection sensor, one or more second feasible groups of structures, wherein the flight path data includes a sequence of structures of the one or more second groups of structures to scan, and wherein the flight path data is determined by minimizing flight time costs for the trip; and execute the trip based on the determined flight path data, wherein executing the trip comprises dispatching the flight vehicle of the selected combination, the flight vehicle equipped with the gas emission detection sensor of the selected combination, the flight vehicle dispatched from the base of the selected combination, to:

aerially inspect, by the flight vehicle using the gas emission detection sensor, the sequence of structures of the one or more second groups of structures; and return the flight vehicle to the base.

6. The apparatus of claim 5, wherein determining the flight path data uses a computer-implemented vehicle routing problem (VRP) solver.

7. The apparatus of claim 5, wherein the at least one processor is further configured to generate a map of the plurality of structures within the plurality of potential gas emission facilities.

8. The apparatus of claim 5, wherein the plurality of gas emission detection sensors are configured to detect at least one of: methane ($CH_4$), carbon-dioxide ($CO_2$), hydrogen sulfide ($H_2S$), hydrogen disulfide ($H_2S_2$) sulphur dioxide ($SO_2$), chlorofluorocarbon (CFC), or hydrofluorocarbon (HFC).

9. A non-transitory computer readable medium comprising computer executable code for aerial inspection of structures for gas emissions, the computer executable code comprising:

code for storing, in memory, aerial inspection data including:

data of at least one of: locations of a plurality of the structures within a plurality of potential gas emission facilities, or a gas emission scanning area associated with the plurality of gas emission facilities, the plurality of potential gas emission facilities including at least one of: one or more well sites, one or more compressor stations, one or more oil refineries, one or more petrochemical plants, one or more petroleum products distributors, one or more petrochemical retail outlets, one or more pipelines, or natural gas distribution facilities;

data of locations of one or more bases, wherein the one or more bases comprise available departure points for aerial inspection for the gas emissions;

data of a plurality of available flight vehicles and one or more operational capabilities of the plurality of available flight vehicles, the one or more operational capabilities including at least one of: a speed, a fuel consumption rate, a fuel capacity, or a turn rate of the plurality of available flight vehicles; and data of a plurality of available gas emission detection sensors and one or more operational capabilities of the plurality of available gas emission detection sensors, the one or more operational capabilities of the plurality of available gas emission detection sensors including at least one of: a scan swath, a scan speed, a scan radius, a deployment restriction, or a detection limit of the plurality of available gas emission detection sensors;

code for determining, by one or more processors, first feasible groups of the plurality of structures iteratively by, for pairs of a flight vehicle, of the plurality of available flight vehicles, and a gas emission detection sensor of the plurality of available gas emission detection sensors:

determining, using the aerial inspection data, a respective group of structures as feasible when a respective gas emission scanning area for the respective group of structures is below a respective gas emission scanning area limit for the respective pair of the flight vehicle and the gas emission detection sensor; and when the respective gas emission scanning area for the respective group of structures is at or above the respective gas emission scanning area limit for the respective pair of the flight vehicle and the gas emission detection sensor:

determining the respective group of structures as infeasible;

determining one or more subgroups of the respective group of structures; and determining whether each of the one or more subgroups is a first feasible group by determining, for each of the one or more subgroups, whether a gas emission scanning area for the subgroup is below the respective gas emission scanning area limit for the respective pair of the flight vehicle and the gas emission detection sensor;

code for determining, by the one or more processors, second feasible groups of the plurality of structures iteratively by, for a plurality of combinations of a base, of the plurality of bases, and a pair of the pairs of flight vehicle and gas emission detection sensor:

determining, using the aerial inspection data, a respective combination of the plurality of combinations as a second feasible group when the respective combination is capable of a trip to aerially inspect a respective first feasible group of the plurality of structures, the trip comprising:

travelling, by the respective flight vehicle from the respective base, to a center of the respective first feasible group of the plurality of structures;

scanning, with the respective gas emission detection sensor, each structure of the respective first feasible group of the plurality of structures; and returning to the respective base; and when the respective combination is incapable of the trip to aerially inspect the respective first feasible group of the plurality of structures:

determining one or more subgroups of the first feasible group; and determining whether each of the one or more subgroups is a second feasible group by determining whether the respective combination is capable of a trip to aerially inspect each respective subgroup;

code for selecting, by the one or more processors, one of the plurality of combinations;

code for determining, by the one or more processors, flight path data representing flight path segments that form a trip to inspect, using the selected combination of base, flight vehicle, and gas emission detection sensor, one or more second feasible groups of structures, wherein the flight path data includes a sequence of structures of the one or more second groups of structures to scan, and wherein the flight path data is determined by minimizing flight time costs for the trip; and code for executing the trip based on the determined flight path data, wherein executing the trip comprises dispatching the flight vehicle of the selected combination, the flight vehicle equipped with the gas emission detection sensor of the selected combination, the flight vehicle dispatched from the base of the selected combination, to:

aerially inspect, by the flight vehicle using the gas emission detection sensor, the sequence of structures of the one or more second groups of structures; and return the flight vehicle to the base.

10. The non-transitory computer readable medium of claim 9, wherein the code for determining the flight path data uses a computer-implemented vehicle routing problem (VRP) solver.

11. The non-transitory computer readable medium of claim 9, further comprising code for generating a map of the plurality of structures within the plurality of potential gas emission facilities.

12. The non-transitory computer readable medium of claim 9, wherein the plurality of gas emission detection sensors are configured to detect at least one of: methane ($CH_4$), carbon-dioxide ($CO_2$), hydrogen sulfide ($H_2S$), hydrogen disulfide ($H_2S_2$) sulphur dioxide ($SO_2$), chlorofluorocarbon (CFC), or hydrofluorocarbon (HFC).

* * * * *